(12) United States Patent  
Proctor

(10) Patent No.: US 6,185,225 B1  
(45) Date of Patent: Feb. 6, 2001

(54) TELECOMMUNICATIONS EQUIPMENT OPERABLE AT TWO DATA RATES

(75) Inventor: Richard J Proctor, Wimborne (GB)

(73) Assignee: Marconi Communications Limited (GB)

( * ) Notice: Under 35 U.S.C. 154(b), the term of this patent shall be extended for 0 days.

(21) Appl. No.: 08/968,317

(22) Filed: Nov. 12, 1997

(30) Foreign Application Priority Data

Nov. 21, 1996 (GB) ................................ 9624180

(51) Int. Cl.$^7$ ........................................ H04L 12/66
(52) U.S. Cl. ........................................ 370/468; 370/463
(58) Field of Search ........................... 370/419, 420, 370/522, 465, 468, 463

(56) References Cited

U.S. PATENT DOCUMENTS 4,481,621   11/1984   Schmack et al. .

5,883,941 * 3/1999 Akers ........................... 379/93.08

* cited by examiner

Primary Examiner—Joseph L. Felber  
(74) Attorney, Agent, or Firm—Kirschstein et al.

(57) ABSTRACT

A copper wire pair linking network terminating equipment in a home with a relatively localized multiplexer, e.g., in a street cabinet, carring high data rate, e.g., VDSL, signals such as ATM and ISDN, combined at the multiplexer. It is necessary for the multiplexer to be provided with a power supply but, in the event of failure of the power supply, VDSL signals could not be generated in the multiplexer. To provide some fall-back in such a case, a metal link from the local exchange to the network terminating equipment is formed, for example, by using relays, thereby permitting ISDN signals to be received in the home even though the higher data rate ATM has now failed.

4 Claims, 3 Drawing Sheets

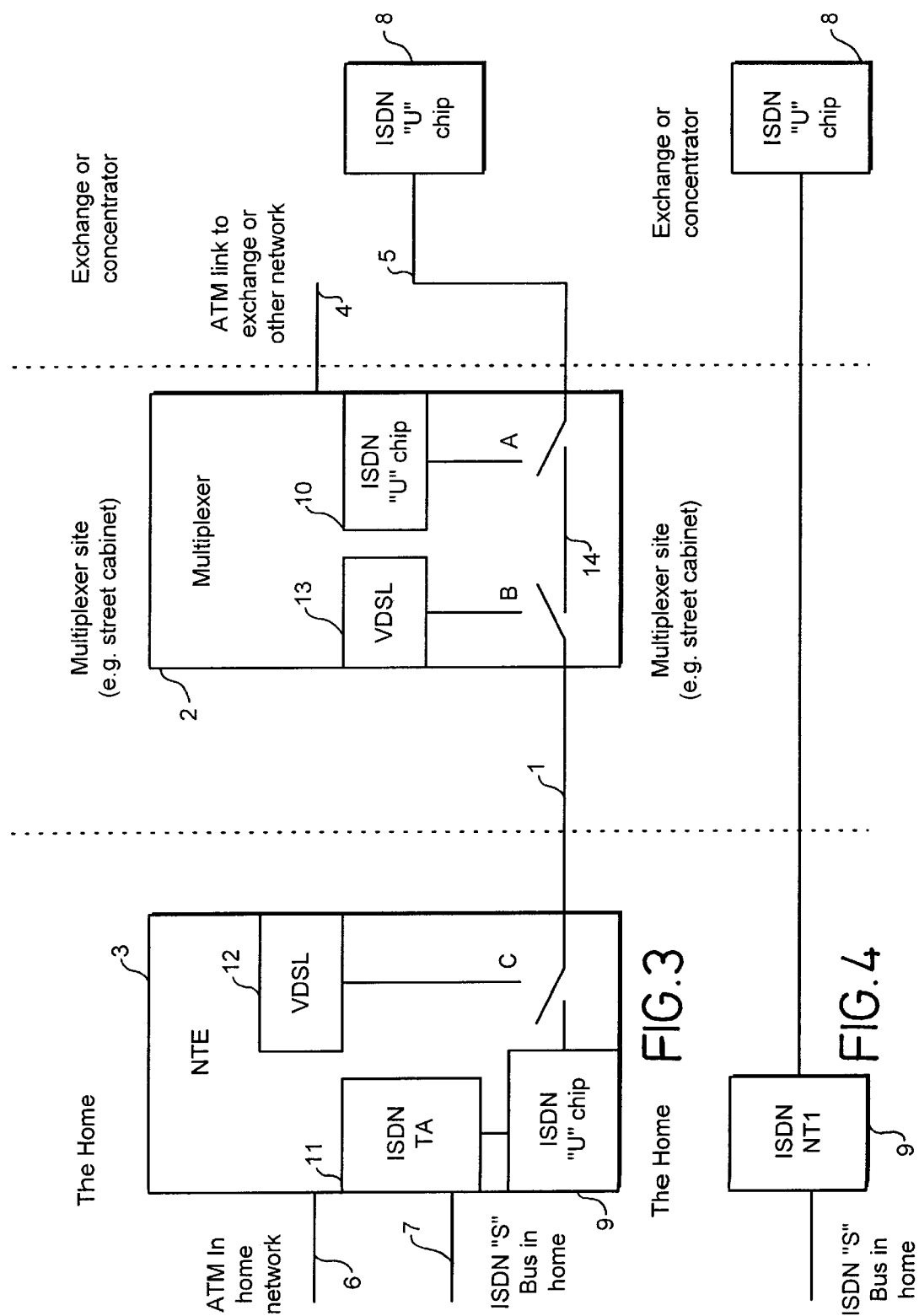

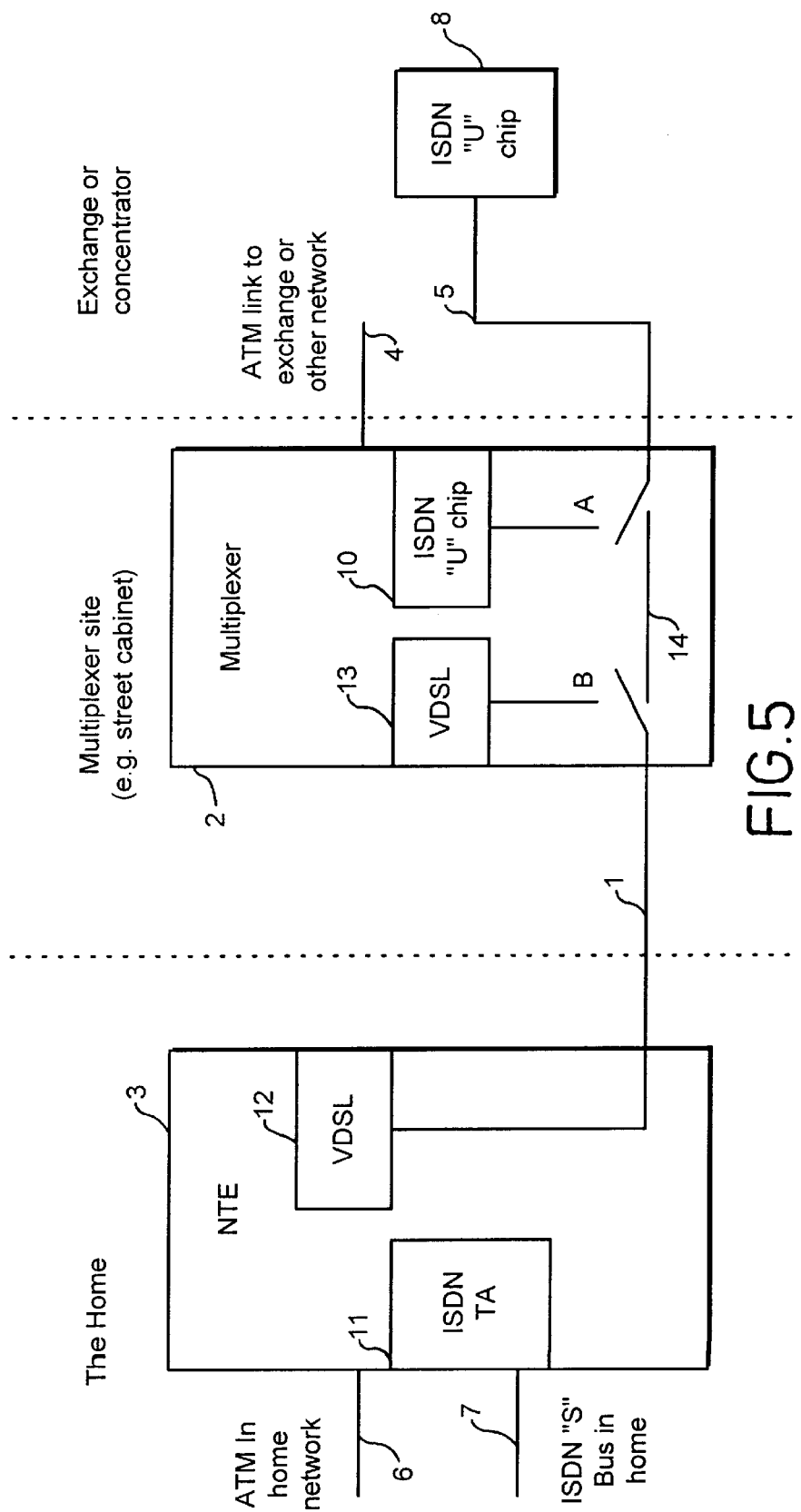

TELECOMMUNICATIONS EQUIPMENT OPERABLE AT TWO DATA RATES

BACKGROUND OF THE INVENTION

This invention relates to telecommunications equipment.

Systems for carrying data at increased rates are being developed, and offer the chance to extend the range of services which customers can enjoy using the terminal in their homes. Existing terminals can handle services according to the ISDN specification such as facsimile transmission or computer communication, in additional to analogue telephony, but higher data rates would offer the chance to transmit television signals into the user terminal as well as to permit interactive viewing. Typically, the terminal in the home is linked to the local exchange by means of copper wire pairs, but the increased bandwidth associated with the higher data rates prevents transmission over such distances eg. up to 9 km.

It has therefore been proposed to provide local sites eg. street cabinets for serving subscribers within a, say, 1 km radius, and to combine at that site services which are separately connected to the local exchange or other network eg. ISDN services linked to the local exchange by copper wire pairs and higher data rate services linked by optical fibre. The telecommunications network, it should be noted, already uses street cabinets in densely populated areas, but these are passive devices.

Because the proposed street cabinets would combine signals, it would be necessary to provide a power supply for them. A problem would then arise in the event that the power supply failed.

SUMMARY OF THE INVENTION

The invention provides network terminating equipment for connection by a link to a communication network to receive line signals, comprising processing means arranged to operate at a data rate appropriate to a line signal representing first services and to extract from the line signal the first services and also second services which are generated at a lower data rate than are the first services but which are incorporated within the line signal, the processing means being selectively capable of operating at the lower rate of the second services to extract the second services from a line signal of that lower data rate.

The invention also provides a multiplexer for connection by a link to network terminating equipment, comprising ports for reception from a communication network of data at one rate representing first services and of data at a lower rate representing second services, means for producing and transmitting along the link a line signal representing the first services and the second services, power supply means for the multiplexer, including means for connecting the port for reception of the data representing the second services directly to the link in the event of failure of the power supply means.

The link eg. a copper wire pair carries data at the first rate appropriate to the first service eg. a high data rate service such as TV, but incorporates the data generated at the lower rate eg. ISDN including analogue telephony, the two being combined by the multiplexer. In the event of power failure, the system drops back to the lower data rate service.

Among the suitable access methods being developed for the high speed data rate facility for terminal users are VDSL (Very High Speed Digital Asymmetrical Subscriber Line, HDSL (High Speed Digital Subscriber Line) and ADSL (Asymmetrical Digital Subscriber Line). ADSL is described in ANSI Reference T1.413. Typically, VDSL could operate with a data rate up to 25 Mbit/sec in one direction, and 3 Mbit/sec in the other direction. Typically HDSL has data rates up to 2 Mbit/sec in each direction, and ADSL has rates up to 6 Mbit/sec in one direction, and a few 100 kbit/sec in the other direction. Compared to this, basic rate ISDN is generated typically at 144 kbit/sec. The lower data rate associated with the second services may be incorporated with the higher data rate associated with the first services in the multiplexer by using the apparatus and method claimed in our co-pending patent application No. 08/970,260, filed Nov. 14, 1997.

BRIEF DESCRIPTION OF THE DRAWINGS

Telecommunication equipment, including a multiplexer and network terminating equipment for connection by a link, constructed in accordance with the invention will now be described, by way of example, with reference to the accompanying drawing in which:

FIG. 3 illustrates the telecommunication equipment in accordance with the a first form of invention;

FIG. 4 illustrates the equivalent circuit of the telecommunication equipment of FIG. 3 in the event of the power failure; and FIG. 5 illustrates the telecommunication equipment according to a second form of the invention.

Like reference numerals have been given to like parts throughout all the figures.

DESCRIPTION OF THE PREFERRED EMBODIMENTS

Figure 1:
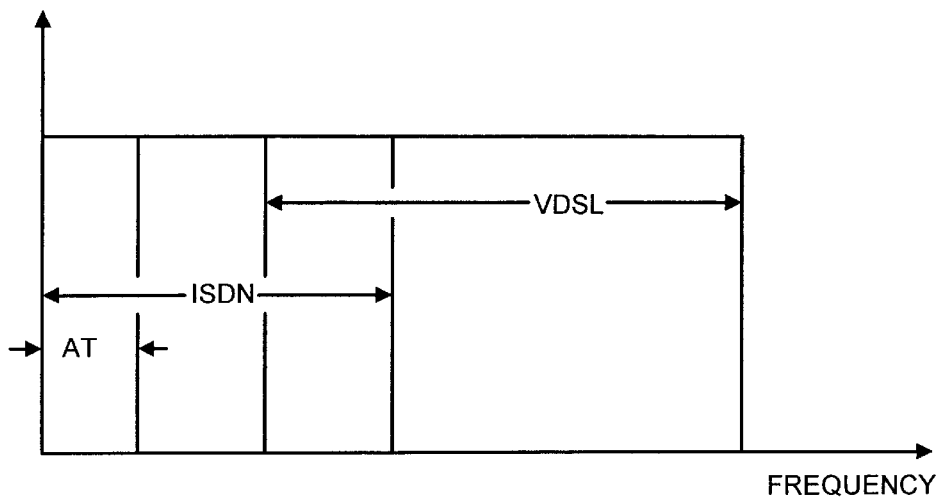
FIG. 1 is a schematic diagram showing the regions of the frequency spectrum occupied by various signals down the link.

Referring to FIG. 1, the bandwidth occupied by analogue telephony is as indicated by "AT", and the bandwidth for ISDN is indicated "ISDN". The VDSL is shown as overlapping with that for ISDN. The higher the transmission frequencies that are used, the greater the loss along a copper wire pair, and it is therefore desired that the bandwidth for VDSL overlaps that for ISDN, because if the bandwidth for VDSL was frequency separated from the bandwidth for ISDN, then severe propagation problems along the copper wire pair would be caused.

Figure 2:
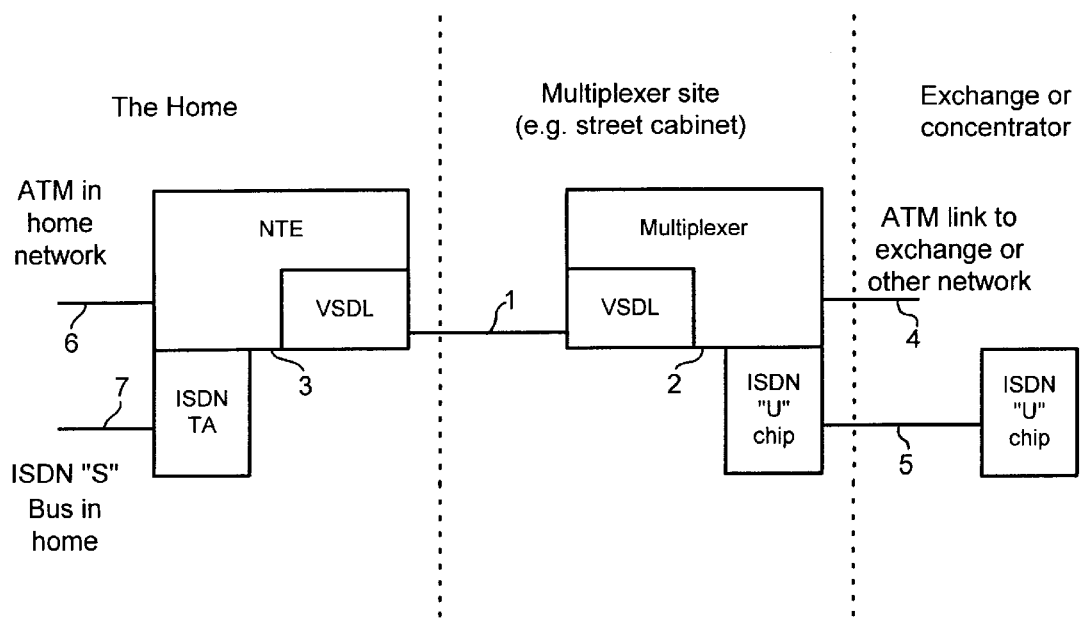
FIG. 2 illustrates the connection of the multiplexer and the network terminating equipment in normal operating conditions.

Referring to FIG. 2 a simple copper wire pair 1 links a multiplexer 2 in a street cabinet with network terminating equipment 3 in a home. In turn the multiplexer 2 in the street cabinet is linked to a local exchange or to a concentrator firstly by means of an optical fibre connection 4 or other high data rate interfaces such as radiopharmaceutical and secondly by means of a copper wire pair 5.

The optical fibre 4 carries ATM (Asynchronous Transfer Mode) which uses communication links between nodes, for example computers that transmit information in small packets known as cells, typically 53 byte long which are short enough for delay sensitive devices but long enough for data, according to ITU-T Recommendation I.150. Typically, the ATM data may be clocked at 155 Mbit/sec or higher. The copper wire pair 5 carries ISDN (eg D channel) which is typically clocked at 144 kbit/sec. It follows that both links 4 and 5 can be relatively long, say, up to 9 km without requiring the use of repeaters.

At the multiplexer 2, the incoming ATM data and ISDN data are multiplexed together and transmitted along the copper wire pair link 1 into the home in VDSL format. To perform this multiplexing, it is necessary for the multiplexer to be provided with a power supply.

At the network terminating equipment in the home, there are two outputs namely, a link 6 which carries ATM into the home and could be connected to a TV set—top box, and could carry TV channels, even allowing for interactive viewing, and a link 7, which consists of four or more copper wires which connect to standard ISDN services such as fax machines, computer connections and, or course, to a telephone. The telephone at least could be incorporated in the same overall housing as the network terminating equipment 3. Because there are four or more wires carrying the ISDN signal, this time in "S" format, the signals on the wires are simpler in nature than the "U" signals passing between the exchange and the multiplexer and the network terminating equipment 3. "S" format is described in ITU Reference I-430 and "U" format is described in ETSI Reference ETS 300 012.

Power must be supplied to the multiplexer in order to permit the combining operation to be carried out.

Referring to FIG. 3, a problem naturally arises in the event of a power failure at the multiplexer site. While it would be normal to provide a battery backup to cover such a situation, as a matter of practical experience it has been found that such batteries sometimes are removed from street cabinets.

In accordance with the invention, relays A, B and C are provided in the multiplexer and the network terminating equipment, which enable the communication network to drop back to ISDN operation even though power is no longer supplied to the multiplexer.

In addition, a chip 9 which receives ISDN in "U" format is provided in the network terminating equipment 3, and is identical to the chip 10 already provided in the multiplexer and which is in turn identical to the ISDN "U" chip 8 provided at the exchange.

In normal operation with power provided at the multiplexer, the ISDN is incorporated with the ATM in the multiplexer, and transmitted on the link 1 by transmitter (VDSL) 13; there is no need for an ISDN "U" chip in the network terminating equipment 3. In normal conditions, the relays A, B and C are all held in the up position and the network terminating equipment 3 delivers ATM on line 6 and, by means of the ISDN terminal adaptor (TA) 11, ISDN "S" on link 7. The ISDN terminal adaptor 11 in turn receives its signal from receiver (VDSL) 12. Since VDSL provides some data transfer back from the home to the multiplexer, VDSL receiver 12 also transmits and VDSL transmitter 13 also receives. The ISDN terminal adaptor incorporates an ISDN "S" chip to generate the ISDN "S" signals for the telephone and fax etc. in the home.

When power is interrupted, the switches A, B and C drop to the lower position, and now the multiplexer 2 is actually bypassed via intermediate link 14 and direct connection is made between the ISDN "U" chip in the exchange and the ISDN "U" chip 9. The link between the exchange and the home then is functionally as shown in FIG. 4. This means that the standard range of ISDN services are available in the home, even though the power has failed at the street cabinet.

The relays A and B at the multiplexer can be held in the upper positions by the power at the street cabinet, so that the direct metallic connection is made when power ceases. As far as the home is concerned, the network terminating equipment 3 may sense the failure of the VDSL link (for example by loss of a carrier signal at a particular frequency) in order for the relay C to drop to the lower position.

A further refinement is shown in FIG. 5, in which the ISDN "U" chip 9 of FIG. 3 is omitted, and this function is emulated by the VDSL receiver 12, whose normal function is to deliver ATM to line 6 and ISDN to the ISDN terminal adaptor 11. The VDSL transmitter receivers 12 and 13 involve sophisticated analogue-to-digital converters and some very fast signal processing, whereas the ISDN "U" chip only needs to handle the four level 2B1Q signal of ISDN. By arranging that the VDSL receiver 12 emulates the ISDN chip 9, one component has been saved from the network terminating equipment.

The drop back method described is also applicable to HDSL and ADSL, dropping back to ISDN, but is also applicable to VDSL dropping back to HDSL or ADSL (which could travel up to 6 km along a copper wire pair) or HDSL dropping back to ADSL, or more generally to any higher data rate service dropping back to a lower data rate service.

What is claimed is:

1. Network terminating equipment for connection by a link to a communication network to receive line signals, comprising: processing means for operating at a data rate appropriate to a line signal representing first services, and for extracting the first services from the line signal and for also extracting second services which are generated at a lower data rate than for the first services but which are incorporated within the line signal, the processing means being selectively capable of emulating a processing means capable of operating at the lower data rate of the second services for extracting the second services from a line signal of said lower data rate.

2. Telecommunications equipment including network terminating equipment for connection by a link to a communication network to receive line signals, comprising: processing means for operating at a data rate appropriate to a line signal representing first services, and for extracting the first services from the line signal and for also extracting second services which are generated at a lower data rate than for the first services but which are incorporated within the line signal, the processing means being selectively capable of emulating a processing means capable of operating at the lower data rate of the second services for extracting the second services from a line signal of said lower data rate.

3. Telecommunications equipment as claimed in claim 2; and further comprising a multiplexer for connection by the link to the network terminating equipment, the multiplexer comprising ports for reception from the communication network of data at one rate representing the first services and of data at a lower rate representing the second services, means for producing and transmitting along the link the line signal representing the first services and the second services, power supply means for the multiplexer, including means for connecting the port for reception of the data representing second services directly to the link in the event of failure of the power supply means.

4. Telecommunications equipment as claimed in claim 3, in which the multiplexer includes at least one relay for connecting said port to the link on failure of the power supply means.

* * * * *